(12) United States Patent
Merz et al.

(10) Patent No.: US 7,975,963 B2
(45) Date of Patent: Jul. 12, 2011

(54) SAFETY SYSTEM FOR REDUCING THE IMPACT ENERGY OF A CONTAINER

(75) Inventors: Ludger Merz, Hamburg (DE); Roland Fuhrmann, Hamburg (DE)

(73) Assignee: Airbus Deutschland GmbH (DE)

( * ) Notice: Subject to any disclaimer, the term of this patent is extended or adjusted under 35 U.S.C. 154(b) by 576 days.

(21) Appl. No.: 12/087,199

(22) PCT Filed: Dec. 15, 2006

(86) PCT No.: PCT/EP2006/012143
§ 371 (c)(1),
(2), (4) Date: Jun. 23, 2008

(87) PCT Pub. No.: WO2007/073897
PCT Pub. Date: Jul. 5, 2007

(65) Prior Publication Data
US 2008/0315037 A1    Dec. 25, 2008

Related U.S. Application Data

(60) Provisional application No. 60/753,905, filed on Dec. 23, 2005.

(30) Foreign Application Priority Data

Dec. 23, 2005  (DE) .................... 10 2005 061 928

(51) Int. Cl.
*B64D 1/10* (2006.01)
(52) U.S. Cl. .............. 244/121; 244/118.1; 410/119; 410/87

(58) Field of Classification Search ............. 244/118.1, 244/118.2, 137.1, 121, 129.1; 188/371, 377; 267/64.27; 410/87, 88, 119, 128
See application file for complete search history.

(56) References Cited

U.S. PATENT DOCUMENTS

| | | | | |
|---|---|---|---|---|
| 2,669,402 A * | 2/1954 | Del Mar | ........... | 410/118 |
| 3,603,535 A * | 9/1971 | DePolo | ........... | 244/121 |
| 3,847,091 A * | 11/1974 | Holt | ........... | 410/119 |
| 4,222,696 A * | 9/1980 | Guins | ........... | 410/128 |
| 4,957,250 A * | 9/1990 | Hararat-Tehrani | ........... | 244/118.1 |
| 5,085,382 A | 2/1992 | Finkenbeiner | | |
| 5,217,184 A * | 6/1993 | Hararat-Tehrani | ........... | 244/118.1 |
| 5,301,902 A * | 4/1994 | Kalberer et al. | ........... | 244/121 |
| 5,542,626 A * | 8/1996 | Beuck et al. | ........... | 244/107 |
| 5,558,300 A * | 9/1996 | Kalberer et al. | ........... | 244/121 |
| 5,649,721 A * | 7/1997 | Stafford et al. | ........... | 280/751 |
| 5,765,778 A * | 6/1998 | Otsuka | ........... | 244/101 |

(Continued)

FOREIGN PATENT DOCUMENTS

CN         2085359 U       9/1991
(Continued)

*Primary Examiner* — Benjamin P Lee
(74) *Attorney, Agent, or Firm* — Lerner, David, Littenberg, Krumholz & Mentlik, LLP

(57) ABSTRACT

A safety system for reducing the impact energy of a container for an aircraft includes an aircraft cargo hold with at least one safety wall; an accommodation device; and at least one airbag. The accommodation device can be affixed to the safety wall, wherein the accommodation device is designed to accommodate the at least one airbag. In the case of a movement of the container, the at least one airbag can be activated so that air can be injected into the airbag so that some of the impact energy of the container can be absorbed by the at least one activated airbag, with the remaining forces then being distributed over an area of the at least one safety wall.

10 Claims, 5 Drawing Sheets

U.S. PATENT DOCUMENTS

| | | | |
|---|---|---|---|
| 5,921,507 A * | 7/1999 | Kalberer et al. | 244/234 |
| 5,992,794 A * | 11/1999 | Rotman et al. | 244/17.17 |
| 6,004,084 A * | 12/1999 | Moker | 410/118 |
| 6,017,175 A * | 1/2000 | Kassab et al. | 410/131 |
| 6,019,237 A * | 2/2000 | Durham et al. | 220/1.6 |
| 6,092,272 A * | 7/2000 | Durham et al. | 29/421.1 |
| 6,588,705 B1 * | 7/2003 | Frank | 244/118.5 |
| 6,930,592 B2 * | 8/2005 | Schlecht et al. | 340/426.29 |
| 2004/0016846 A1 | 1/2004 | Blackwell-Thompson et al. | |
| 2005/0023859 A1 | 2/2005 | Ali et al. | |
| 2005/0193828 A1 | 9/2005 | Morikawa | |
| 2009/0140100 A1 * | 6/2009 | Mueller et al. | 244/158.9 |
| 2010/0181421 A1 * | 7/2010 | Albagli et al. | 244/100 A |
| 2010/0206983 A1 * | 8/2010 | Tho et al. | 244/100 A |
| 2010/0276540 A1 * | 11/2010 | Rojo | 244/121 |
| 2011/0011973 A1 * | 1/2011 | Shahar et al. | 244/100 A |

FOREIGN PATENT DOCUMENTS

| | | |
|---|---|---|
| DE | 38 27 279 A1 | 2/1990 |
| DE | 41 36 973 A1 | 5/1993 |
| EP | 0 354 403 A2 | 2/1990 |
| JP | 2003165381 A | 6/2003 |
| RU | 97108679 A | 8/1996 |
| SU | 1742152 A1 | 6/1992 |

* cited by examiner

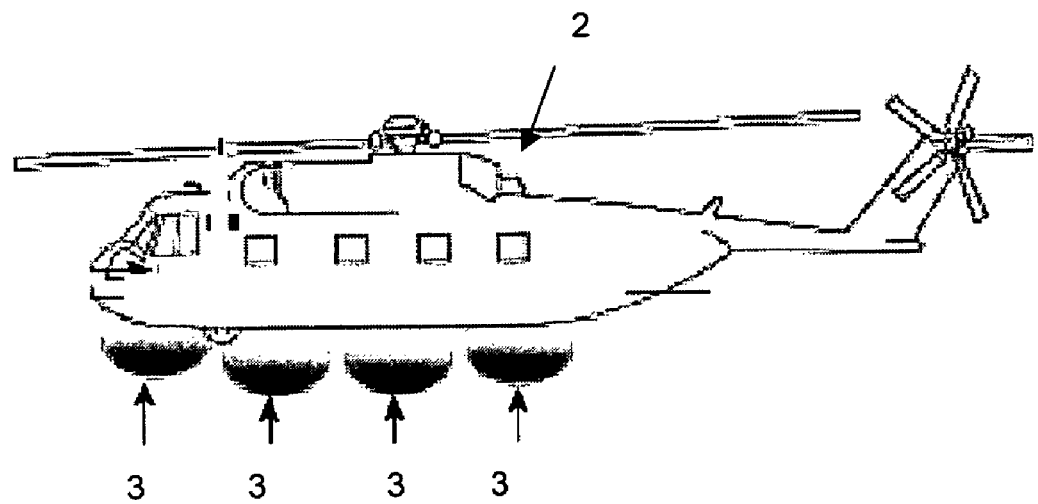
Fig.1 – State of the art
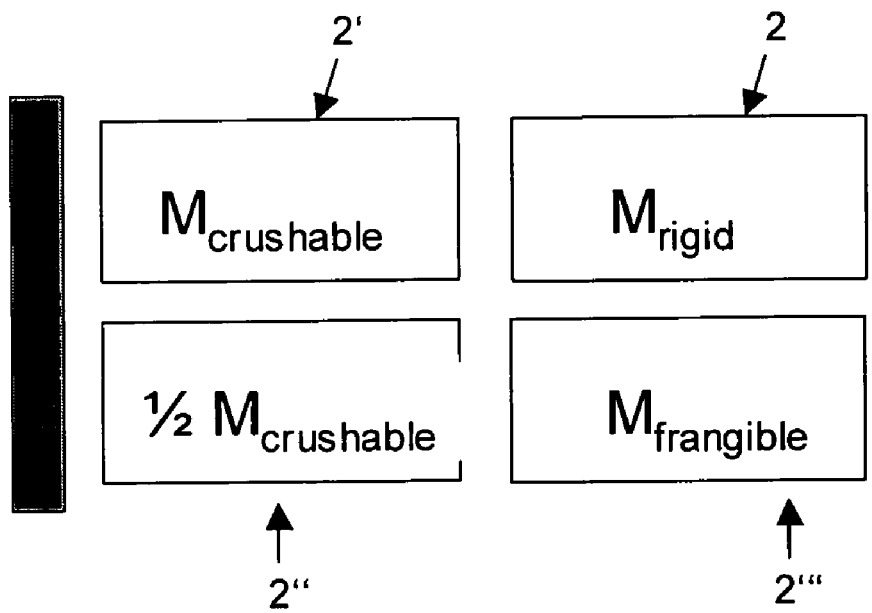
Fig.2 – State of the art

SAFETY SYSTEM FOR REDUCING THE IMPACT ENERGY OF A CONTAINER

This application claims the benefit of the filing date of the German Patent Application No. 10 2005 061 928.2 filed Dec. 23, 2005 and of the U.S. Provisional Patent Application No. 60/753,905 filed Dec. 23, 2005, the disclosures of which are hereby incorporated herein by reference.

TECHNICAL FIELD

The present invention relates to a safety system and to a method for reducing the impact energy of a container, to an aircraft, and to the use of a safety system for reducing the impact energy of a container in an aircraft.

BACKGROUND TO THE INVENTION

In the transport of payloads in aircraft, fastening devices for payloads have to be able to withstand all kinds of flight manoeuvres and other aircraft movements as well as survivable accident scenarios. Nonetheless, if containers do become loose, no damage to persons or to the aircraft structure must arise. For this reason a suitable safety system is prescribed that protects the structure of the aircraft against any impact by containers.

To this effect, in the majority of cases protective walls are installed at particular positions in the cargo hold of an aircraft, for example in order to secure the cockpit—or areas where there are passengers—against impact by containers.

Furthermore, various safety directives have to be met in order to protect certain regions in an aircraft against containers that have become detached. A safety directive, for example, relates to the required arrangement of certain containers in the cargo hold. It is, for example, a requirement that the first container behind a protective wall contains a less rigid or softer payload, so as to in this way ensure cushioning between a protective wall and a rigid container.

PRESENTATION OF THE INVENTION

It is an object of the present invention to ensure safety in an aircraft cargo hold by a more effective and easier method that furthermore provides the customer with more free spaces for loading.

This object is met by a safety system and by a method for reducing the impact energy of a container for an aircraft, by an aircraft comprising a safety system, and by the use of a safety system in an aircraft for reducing the impact energy of a container according to the independent claims.

According to an exemplary embodiment of the invention, a safety system for reducing the impact energy of a container for an aircraft is provided. In this arrangement the safety system comprises an aircraft cargo hold with at least one safety wall, an accommodation device and at least one airbag. The accommodation device is affixed to the safety wall, wherein the accommodation unit is designed to accommodate the at least one airbag. In the case of a movement of the container, the at least one airbag can be activated such that air can be injected into the airbag so that the impact energy of a container can be distributed, by means of this activated at least one airbag over an area of the at least one safety wall.

According to an exemplary embodiment of the invention, a method for reducing the impact energy of a container for an aircraft is provided. In a first step in an aircraft cargo hold at least one safety wall is provided, and an accommodation unit is affixed to the at least one safety wall. The at least one airbag is affixed to the accommodation unit. When the container moves, the at least one airbag is activatable such that air can be injected into the airbag so that, by means of the at least one activated airbag the impact energy of the container can be distributed over an area of the at least one safety wall.

According to a further exemplary embodiment of the invention, a safety system for reducing the impact energy of a container in an aircraft is provided.

According to yet another exemplary embodiment, an aircraft with a safety system for reducing the impact energy of a container is provided.

In this arrangement, according to the present invention, the at least one airbag can absorb some of the impact energy and/or can distribute the remaining forces over an area of the at least one safety wall.

The present invention provides a safety system by means of which the effectiveness of protective walls is significantly improved. While rigid containers can become detached and can cause considerable damage to the protective wall, the impact of the containers is cushioned because of the activated airbags. Furthermore, the inflated airbags distribute the impact energy over a larger area of the protective wall so that the impact energy per unit of area can be significantly reduced. In addition, as a result of the protective system according to the invention it may be unnecessary to comply with additional loading regulations so that there are no longer any restrictions relating to the arrangement of rigid and soft containers in the cargo hold. Aircraft operators can thus affix their containers as they please in the cargo hold, which significantly simplifies logistics. Consequently the times required for loading and unloading are also reduced because an optimal arrangement in a cargo hold becomes possible without any restrictions.

According to a further exemplary embodiment of the invention the accommodation device comprises locking elements so that the airbag can be detached from the surroundings and is thus protected. When the at least one airbag is activated, the locking elements can be hinged opened such that the airbag is unfoldable by means of the injection of air in the direction of the surroundings. When containers are loaded in an aircraft loading space, damage to the airbag is thus prevented so that containers can be placed significantly faster and more flexibly into an aircraft loading space.

According to a further exemplary embodiment of the invention, the safety system comprises a multitude of airbags that can be affixed to the at least one safety wall, wherein the multitude of airbags cover certain regions of the protective wall. In this way it is possible to equip only certain regions of the protective wall with the safety system or the airbags, so that no airbags are unnecessarily in place, for example, in regions where no impact of containers can occur. In this way weight savings can be achieved.

Nonetheless, according to a further exemplary embodiment of the invention, a multitude of airbags can be affixed to the at least one safety wall, wherein the airbags can cover the entire area of the protective wall. Thus in the case of varying loading of containers in the aircraft loading space every imaginable impact region can be secured with the use of airbags. In this way the safety aspect can be significantly improved and reconfiguration of the impact regions or of the safety system when the containers are arranged differently can be avoided.

According to a further exemplary embodiment of the invention, at least one airbag comprises an opening through which air can discharge to the environment so that in addition defined cushioning of the impact energy can be set. By way of this outlet aperture a particular outflowing volume flow per time unit can be set so that any desired or continuous discharge makes it possible to cushion the impact energy. Thus the impact energy is not exclusively distributed over the protective wall by means of the airbags, but in addition it is cushioned by way of the air-volume stream discharging from the airbag.

According to a further exemplary embodiment of the invention, the safety system further comprises an activation system for activating the at least one airbag. In this arrangement the activation system is designed such that before the container hits the at least one safety wall the at least one airbag for distributing the impact energy can be activated. The airbags can thus be arranged on the protective wall in an extremely space-saving manner without being filled with air, and can be filled with air only when a particular signal of the activation system is triggered, thus forming an air cushion between the container and the protective wall.

According to a further exemplary embodiment of the invention, the activation system comprises at least one monitoring device for activating the at least one airbag. This at least one monitoring device can be selected from the group comprising motion detectors, video cameras and pressure sensors. By means of the video camera, by comparing the video images, movement of the container can be detected, and thereafter filling of the airbag with air can be activated. Likewise, motion detectors can be employed. Furthermore, the containers can be fastened on tactile sensors or pressure sensors so that if the position of a container changes, an airbag is activated because of the resulting change in the pressure point.

According to a further exemplary embodiment of the present invention, the safety system further comprises a fastening element for fastening the payload, wherein the monitoring system monitors the fastening element such that in the case of deformation of the fastening element the at least one airbag is activatable by means of the activation system. For example, if a fastening element ruptures, the monitoring system detects this and by way of the activation system automatically activates the at least one airbag. Defects in, or damage to, fasteners of the containers can thus be detected quickly so that extensive damage can be prevented in a simple manner.

According to a further exemplary embodiment of the present invention, an impact region of the protective wall can be measured by means of the activation system such that in the impact region the at least one airbag can be activated. This provides the option of not activating all the airbags of an entire protective wall but only those airbags that are required for cushioning the impact energy or for protecting the protective wall. In this arrangement, by means of electrical sensors such as for example a video camera or a movement detector, a possible impact region on the protective wall can be detected or measured so that it is only in this region that the airbags are activated, thus protecting the protective wall. Since often single-use airbags are used, it is thus possible to avoid wasting the airbags affixed to the protective wall, which helps to reduce costs.

The designs of the safety system also apply to the method, to the use and to the aircraft, and vice-versa.

The safety system according to the invention thus provides greater flexibility in the arrangement of containers in an aircraft loading space, which makes it easier for aircraft operators to fasten containers in any desired manner in an aircraft loading space. Furthermore, safety concerning detached containers in an aircraft cargo hold can be considerably increased, and damage to the protective wall or to the aircraft structure can be prevented.

BRIEF DESCRIPTION OF THE DRAWINGS

Below, for further explanation and for improved understanding of the present invention, exemplary embodiments are described in more detail with reference to the enclosed drawings.

FIG. 1 shows a diagrammatic view of a safety system, used in the field of aviation, for reducing impact energy;

FIG. 2 shows a diagrammatic view of an arrangement of containers according to a common safety standard in the field of aviation;

DETAILED DESCRIPTION OF EXEMPLARY EMBODIMENTS

Similar or identical components in different figures are provided with the same reference signs. The illustrations in the figures are diagrammatic and not to scale.

Figure 3:
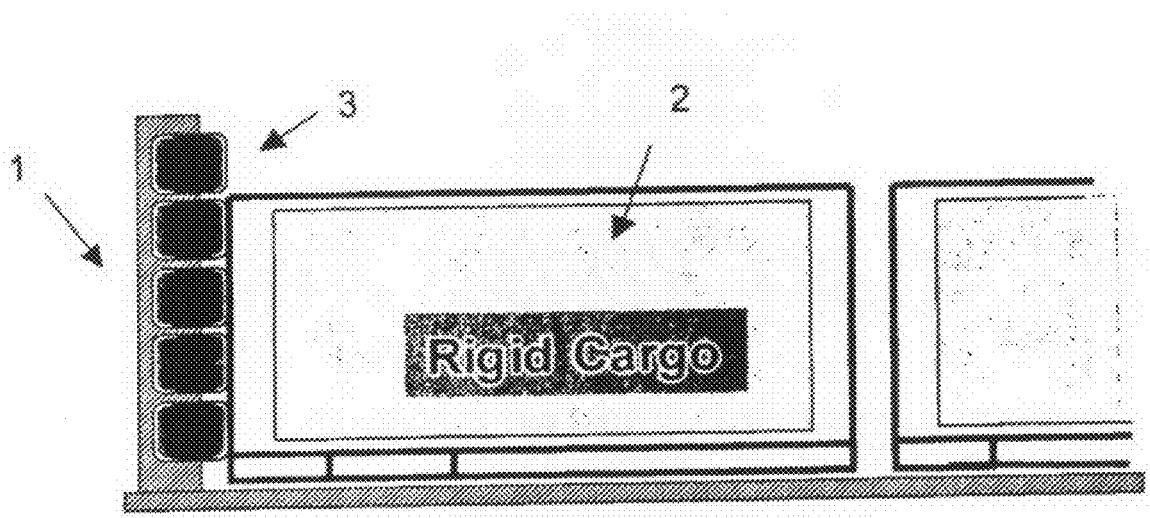
FIG. 3 shows a diagrammatic view of an embodiment of the invention.

FIG. 3 shows a diagrammatic view of the safety system according to an embodiment of the present invention. In this arrangement the safety system comprises an aircraft cargo hold 10 with at least one safety wall 1, an accommodation unit 4 and at least one airbag 3. In this arrangement the accommodation device 4 is affixed to the safety wall, wherein the accommodation device 4 is designed to accommodate the at least one airbag 3. In the case of a movement of the container 2, 9, the at least one airbag 3 can be activated such that air can be injected into the airbag 3 so that the impact energy of the container 2, 9 can be distributed, by means of this at least one activated airbag 3 over an area of the at least one safety wall 1.

FIG. 1 shows an application of airbags in the field of aviation, as known from the state of the art. In this arrangement, for example, helicopters can be protected, in the case of a crash, by means of inflatable airbags 3 so that the helicopter structure does not break up when it hits the ground, and so that the passengers are protected.

FIG. 2 shows a common arrangement of containers, as described, for example, in safety directives in the field of aviation. The diagram shows that in each case between the safety wall 1 and the first rigid and solid container 2 a soft container with cushioning characteristics 2', 2" has to be affixed so that if the container 2 becomes detached the impact energy acting on the safety wall 1 is reduced. Thus, restrictions in relation to the arrangement of the containers are prescribed, which results in a disadvantage to the aircraft operator, and in the logistics for loading a loading space becoming significantly more complex.

With the embodiment of FIG. 3 an optimal safety system is provided. Due to the cushioning system by way of the airbags 3, which are attached to the protective wall 1 by means of the accommodation units 4, there is now an option of affixing a rigid container 2 that comprises poor cushioning characteristics directly behind the protective wall 1.

Figure 4:
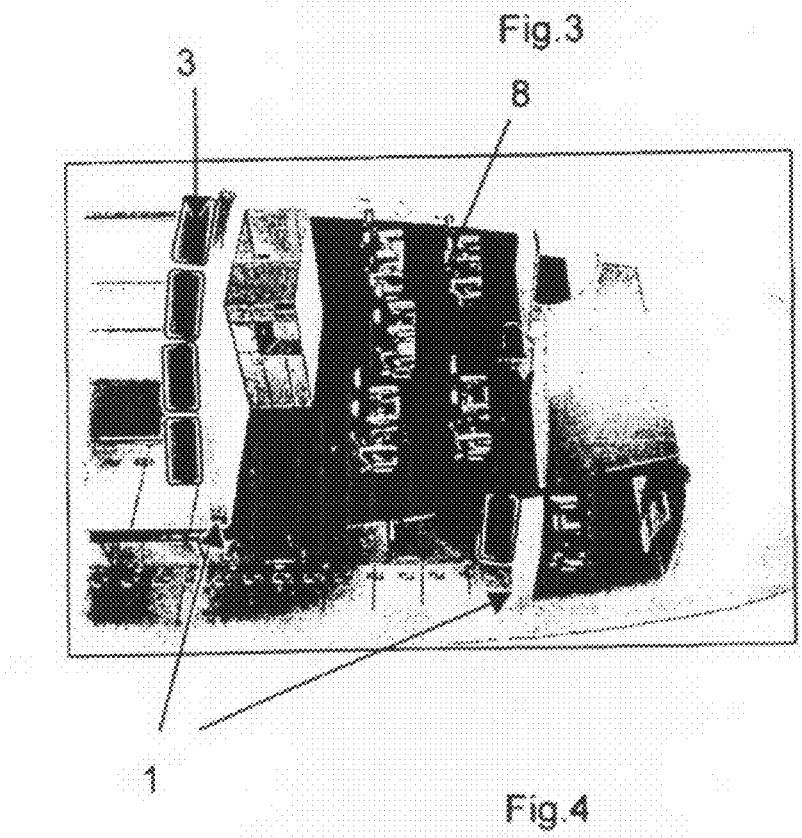
FIG. 4 shows a diagrammatic view of a securing wall for separating various aircraft regions.

FIG. 4 shows a possible option of using the safety system according to the invention in an aircraft. A passenger space 8 is separated from the cargo hold by means of the protective wall 1. It becomes clear that if containers become detached the passenger region 8 has to be protected against the containers entering said passenger region 8, so that dangerous situations can be prevented. FIG. 4 diagrammatically shows that the airbags 3 of the protective wall 1 can spread in the direction of the cargo hold so that detached containers, that hit the protective wall, can be cushioned.

Figure 5:
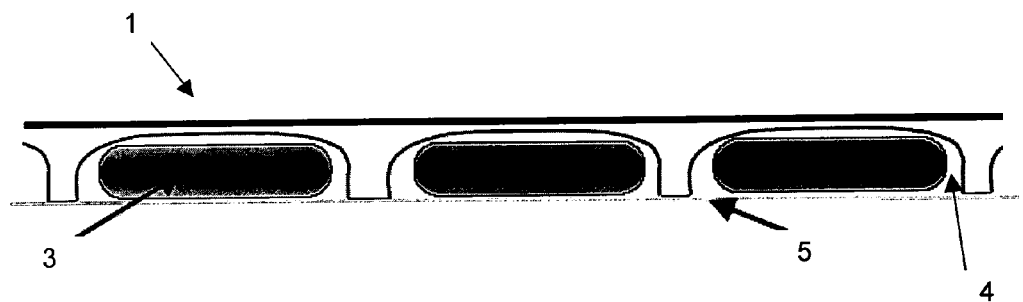
FIG. 5 and FIG. 6 show diagrammatic views of airbags affixed to the securing wall.
Figure 6:
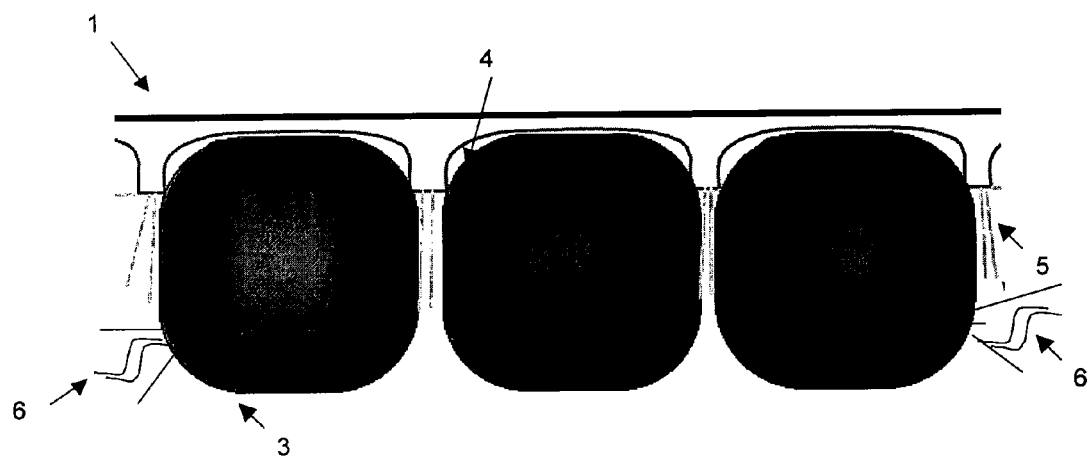

FIG. 5 shows one possible way of accommodating the airbags on a protective wall 1. The accommodation units 4, which in the diagram are shown as indentations in the protective wall 1, can accommodate the airbags 3. In addition there is the option, by way of a locking element 5, to protect the airbags 3 from the surroundings. In particular during loading and unloading processes it is thus possible to prevent any damage occurrence to the airbags 3. By way of an activation system the locking elements open up, and the airbags can extend in the direction of the surroundings by means of air injection. FIG. 6 also shows an opening 6 from which the injected air can escape from the airbag 3 at a certain discharge rate, i.e. a certain air mass flow per unit of time. This provides the option, by means of a defined discharge rate or an outflowing volume flow, to obtain additionally defined cushioning. For example, if a container 2 hits the airbags 3, then the airbag not only distributes the impact energy over a particular region of the protective wall 1, but it also, in addition, cushions the impact energy of the container 2 by way of an air mass flow that issues from the opening 5 at a defined rate.

Figure 7:
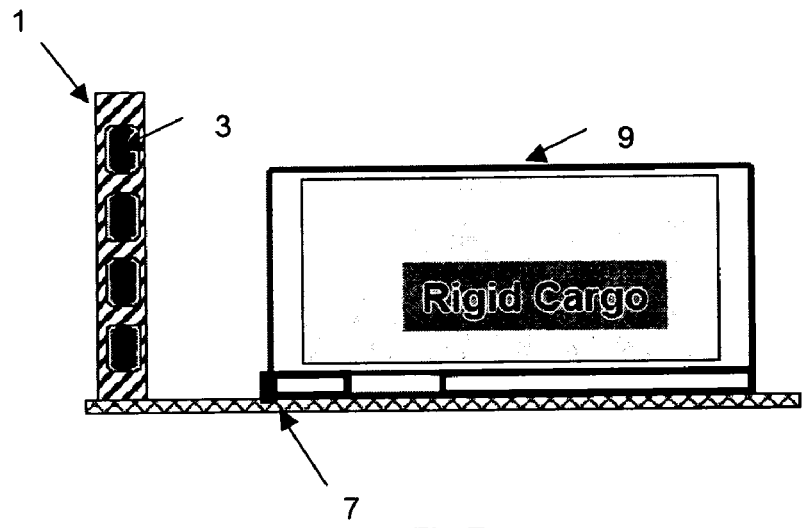
FIG. 7 to FIG. 9 show a diagrammatic view of an embodiment of the airbag protection system according to an embodiment of the invention.
Figure 8:
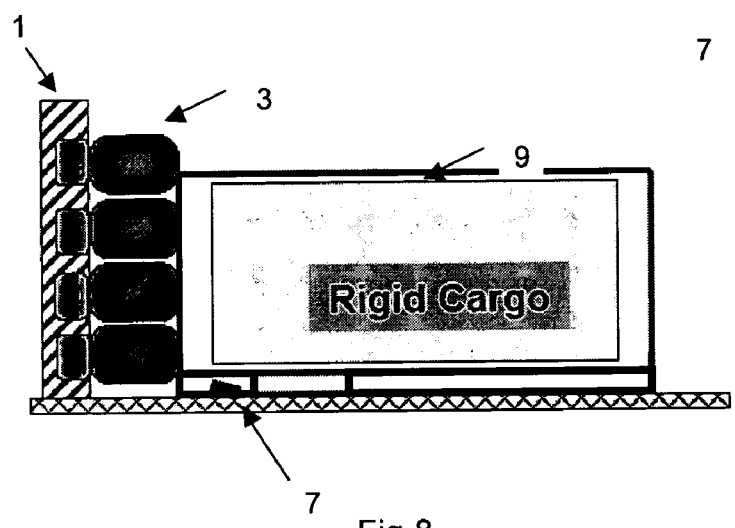
Figure 9:
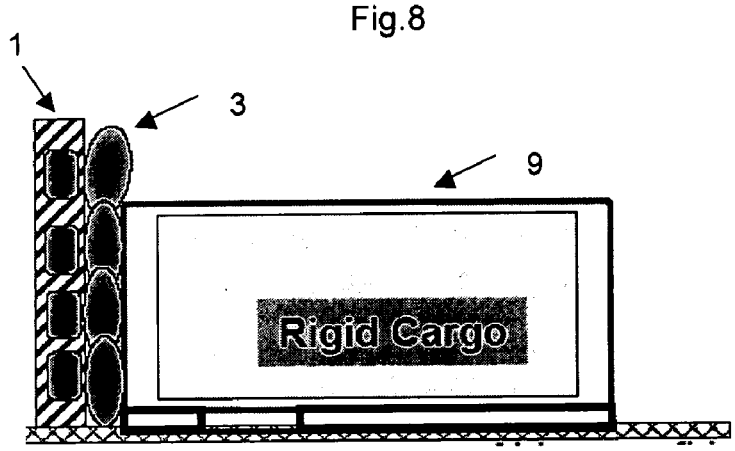

FIGS. 7 to 9 show an exemplary embodiment of the invention with an activation system. In FIG. 7 a container is held to an aircraft floor by means of the fastening element 7. Due to a deformation of the fastening element 7, for example by the rupturing of the fastening element 7 as a result of air pockets or other flight manoeuvres, the activation system automatically and without manual intervention activates triggering of the airbag 3. FIG. 7 shows that already before the container 9, 2 hits the safety wall 1, the airbags 3 are filled with air. FIG. 8 shows how the air-filled airbags 3 distribute the impact energy over an area of the securing wall 1. As a result of the cushioning and the distribution of the impact energy by the airbags 3, the container 9 comes to a standstill without establishing direct contact with the protective wall 1 so that optimal protection is ensured.

Figure 10:
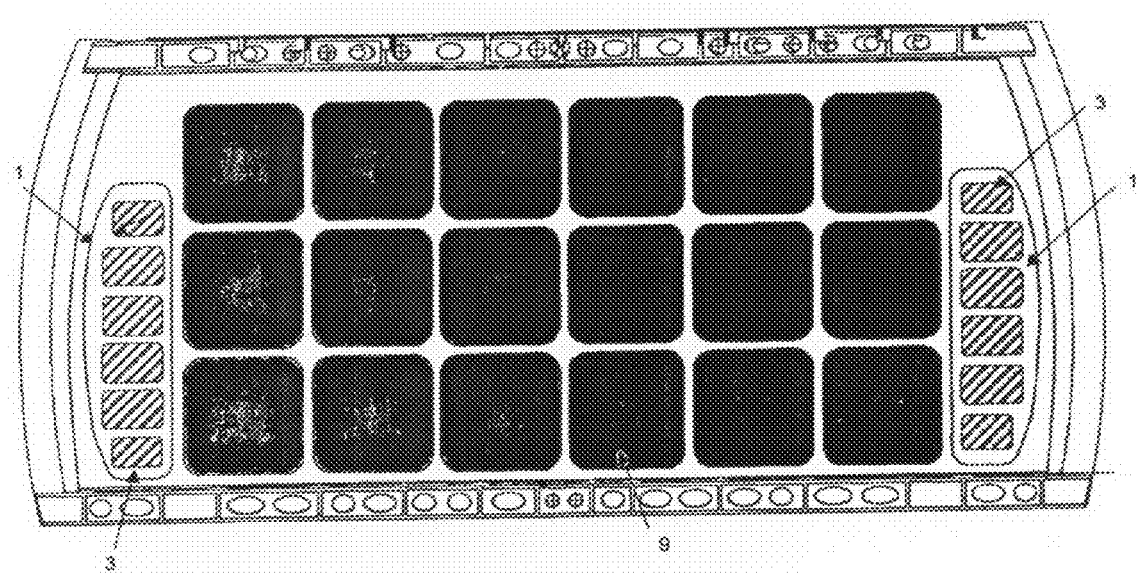
FIG. 10 shows a diagrammatic view of a loading space with stacked containers.

FIG. 10 shows a possible arrangement of containers that can be vertically stacked while nevertheless being protected by the airbags 3 in the protective wall 1.

In addition, it should be pointed out that "comprising" does not exclude other elements or steps, and "a" or "one" does not exclude a plural number. Furthermore, it should be pointed out that features or steps, which have been described with reference to one of the above exemplary embodiments, can also be used in combination with other features or steps of other exemplary embodiments described above. Reference characters in the claims are not to be interpreted as limitations.

The invention claimed is:

1. A safety system for reducing the impact energy of a container for an aircraft, wherein the safety system comprises:
    an aircraft cargo hold comprising at least one safety wall;
    an accommodation unit;
    at least one airbag;
    an activation system comprising at least one monitor for activating the at least one airbag; and
    a fastener element for fastening the container;
    wherein the accommodation unit can be affixed to the at least one safety wall;
    wherein the accommodation unit accommodates the at least one airbag;
    wherein in the case of movement of the container, the at least one airbag can be activated such that air can be injected into the airbag so that the impact energy of the container can be distributed by the at least one activated airbag over an area of the at least one safety wall;
    wherein the monitor monitors the fastener such that in the case of deformation of the fastening element the at least one airbag is activatable by the activation system; and
    wherein the activation system permits the at least one airbag to be activated before the container hits the at least one securing wall.

2. The safety system of claim 1, wherein the accommodation unit comprises locking elements so that the airbag can be detached from the surroundings; and
    wherein if the at least one airbag is activated, the locking elements can be hinged open such that the at least one airbag is unfoldable by the injection of air in the direction of the surroundings.

3. The safety system of claim 1, further comprising a plurality of airbags that can be affixed to the at least one safety wall, and
    wherein the airbags cover one or more regions of the protective wall.

4. The safety system of claim 1, further comprising a plurality of airbags that can be affixed to the at least one safety wall, and
    wherein the airbags cover the entire area of the protective wall.

5. The safety system of claim 1, wherein at least one airbag comprises an opening (6) through which air can discharge to the environment so that in addition defined cushioning of the impact energy can be set.

6. The safety system of claim 1, wherein the at least one monitoring device is selected from the group comprising motion detectors, video cameras, tactile sensors and pressure sensors.

7. The safety system of claim 1, wherein the monitoring device is designed such that an impact region of the container on the protective wall is detectable so that in the impact region the at least one airbag can be activated by the activation system.

8. A method for reducing the impact energy of a container for an aircraft, comprising:
    providing at least one safety wall in an aircraft cargo hold;
    affixing an accommodation unit to the safety wall;
    affixing at least one airbag to the accommodation unit;
    wherein, when the container moves, the at least one airbag is activatable such that air can be injected into the airbag so that by the at least one activated airbag the impact energy of the container can be distributed over an area of the at least one safety wall;
    monitoring a fastener of the container by an activation system;
    activating the at least one airbag by the activation system in the case of deformation of the fastener.

9. The method of claim 8, further comprising:
    setting defined cushioning of the impact energy by providing an opening in the at least one airbag for continuous discharge of air to the environment.

10. An aircraft comprising a safety system for reducing the impact energy of a container, the safety system comprising:
    an aircraft cargo hold comprising at least one safety wall;
    an accommodation unit;
    at least one airbag;

an activation system comprising at least one monitor for activating the at least one airbag; and a fastener element for fastening the container, wherein the accommodation unit can be affixed to the at least one safety wall;

wherein the accommodation unit accommodates the at least one airbag;

wherein in the case of movement of the container, the at least one airbag can be activated such that air can be injected into the airbag so that the impact energy of the container can be distributed by the at least one activated airbag over an area of the at least one safety wall;

wherein the monitor monitors the fastener such that in the case of deformation of the fastening element the at least one airbag is activatable by the activation system; and wherein the activation system permits the at least one airbag to be activated before the container hits the at least one securing wall.

* * * * *

UNITED STATES PATENT AND TRADEMARK OFFICE
CERTIFICATE OF CORRECTION

PATENT NO. : 7,975,963 B2  
APPLICATION NO. : 12/087199  
DATED : July 12, 2011  
INVENTOR(S) : Ludger Merz and Roland Fuhrmann Page 1 of 1

It is certified that error appears in the above-identified patent and that said Letters Patent is hereby corrected as shown below:

Col. 5, Line 65, "fastener" should read --fastening--.
Col. 6, Line 8, "fastener" should read --fastening element--.
Col. 6, Line 13, "securing" should read --safety--.
Col. 6, Line 55, "fastener" should ready --fastening element--.
Col. 6, Line 58, "fastener" should ready --fastening element--.
Col. 7, Line 3, "fastener" should ready --fastening--.
Col. 8, Line 3, "fastener" should ready --fastening element--.
Col. 8, Line 8, "securing" should read --safety--.

Signed and Sealed this
Twenty-second Day of November, 2011

David J. Kappos
*Director of the United States Patent and Trademark Office*